H. C. SEIPP.
TIRE.
APPLICATION FILED JUNE 2, 1913.
1,098,364.  Patented May 26, 1914.
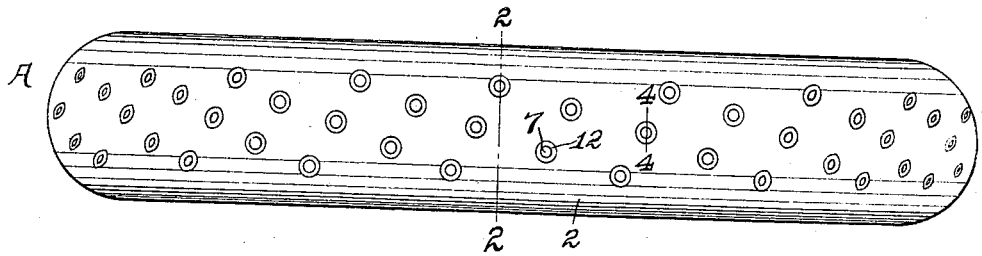
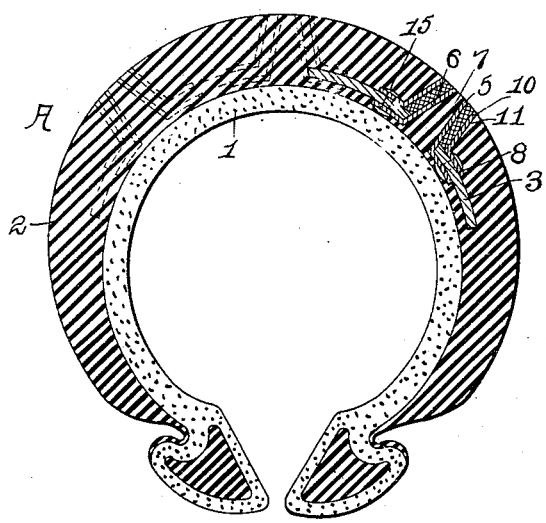
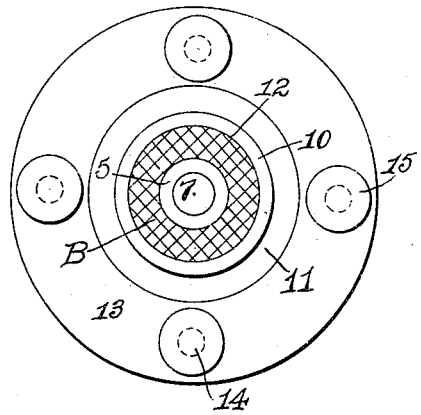
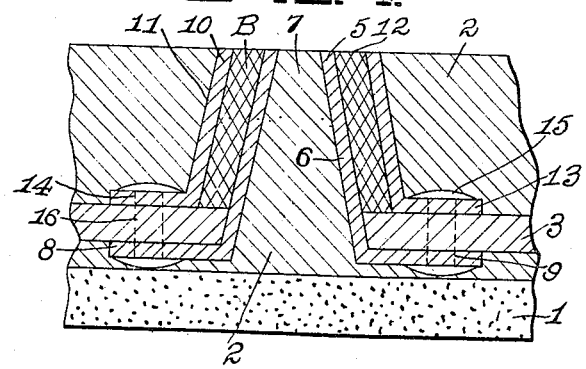
Witnesses:  Inventor:

UNITED STATES PATENT OFFICE.

HENRY C. SEIPP, OF PITTSBURGH, PENNSYLVANIA.

TIRE.

1,098,364.  Specification of Letters Patent.  Patented May 26, 1914.

Application filed June 2, 1913. Serial No. 771,166.

*To all whom it may concern:*

Be it known that I, HENRY C. SEIPP, a citizen of the United States, and a resident of Pittsburgh, in the county of Allegheny and State of Pennsylvania, have invented a new and useful Improvement in Tires; and I do hereby declare the following to be a full, clear, and exact description thereof.

My invention relates to tires and has special reference to a tire of the non-slipping type in which part of the tread surface of the tire consists of a non-slipping material adapted to engage with the pavement in order to take a firm hold upon the same.

The object of my invention is to provide a cheap, simple and efficient form of tire which can be easily manufactured and one in which there will be no danger of skidding such as in the ordinary rubber tire now used.

My invention consists, generally stated, in the novel arrangement, construction and combination of parts as hereinafter more specifically set forth and described, and particularly pointed out in the claims.

To enable others skilled in the art to which my invention appertains to construct and use my improved tire, I will describe the same more fully referring to the accompanying drawing, in which—

Figure 1 is a plan view of the tread of the same. Fig. 2 is a cross-sectional view of the same on the line 2—2, Fig. 1. Fig. 3 is a plan view of the insert used in the construction of the tire. Fig. 4 is an enlarged cross-sectional view on the line 4—4, Fig. 1.

Like symbols of reference herein indicate like parts in each of the figures of the drawing.

It is a well known fact that the ordinary rubber tire is very likely to skid along on the pavements, particularly if such pavement is damp and in a slippery condition and this is particularly true of asphalt pavements when the same are wet. Many devices have been resorted to, to overcome this skidding, but by reason of the inability of holding the non-slipping material within the rubber tire, or of the utter impracticability of the devices used for preventing the slipping these experiments have proved to be of little success. In my improved form of tire, I have combined with material which will take a firm grip upon the pavements, and method of holding the non-slipping material within the tire tread, so that the same will not injure the tire nor be pulled from the same by contact with the pavements.

As illustrated in the drawing, my improved tire is of the ordinary shape, and can be made of any desired size, while the contour of the same is precisely the same as the contour of the ordinary tires now used.

My improved tire A has the ordinary inner fabric 1 within the same, on the outer side of which is the ordinary rubber or other suitable materials 2, which form part of the tread surface of such tire, while a leather strip 3 is adapted to pass around the periphery of such tire, and within close proximity to the fabric 1, and such leather strip 3 is provided at suitable intervals with openings 4 through the same for the insertion of a ferrule 5. The ferrule 5 has its side walls 6 tapered inwardly toward its outer end, and the opening 7 within the same is adapted to be filled with rubber or other suitable material 2. The flanged portion 8 of such ferrule, is provided with holes 9, spaced at suitable intervals around the same, and while in the present case such flange is provided with four holes, this number may be changed to suit any condition. The flange 8 is adapted to rest between the leather strip 3 and the fabric 1 as hereinafter described.

Fitting around the ferrule 5 is another ferrule 10, which is of greater diameter than the ferrule 5, and has its side walls 11 tapered parallel with the side walls 6 of the ferrule 5, so that an annular compartment 12 is provided between the side walls 6 and 11 of the ferrules 5 and 10 respectively, and into this chamber a non-slipping material B is inserted for gripping on the pavements. The ferrules 5 and 10 are formed of some suitable material, such as brass, steel, etc., and when such ferrules are in position, such as shown in the drawing, the outer surface will present an inner ring of metal filled with rubber, a ring around the first ring, and a non-slipping material B, such as lead, between the two rings. The ferrule 10 is provided with a flange 13 which has holes 14 within the same, and corresponding to the holes 9 in the flange 8 of the ferrule 5, so that rivets 15 may be passed through such holes, and through holes 16 in the leather strip 3 for holding said ferrules in position on said strip.

The outer ends of the ferrules 5 and 10 with their filling of non-slipping material B, are in line with the outer periphery tread surface of the tire A, so that such ferrules and non-slipping material will be worn down as the rubber 2 is worn down, and will always present a smooth, even surface, and, as there is sufficient resiliency in the rubber, the non-slipping material B will always grip the pavement and prevent any slipping or skidding of the wheels.

It will readily be seen that the non-slipping devices thus inserted in the tires, and held by the leather strip 3, will be prevented from being pulled out of the tire by reason of their connection with said strip, and at the same time, such strip will be sufficiently pliable to allow the tread devices to assume any convenient position in the rubber or other suitable material 2 of the tire, due to the constantly changing contour of the tread. It will also be seen that the leather strip holding such tread devices, will prevent the same from being pulled from the rubber in the tire, by reason of the same being fastened securely to said strip, and practical experiments and demonstrations have shown that tires equipped with this form of non-slipping device, will not skid or slip, even on asphalt pavements during wet and rainy weather, which is the hardest test to which a tire for preventing slipping and skidding can be put to.

I do not limit myself to any particular size or shape of ferrule but any design for the insertion of the anti-slipping material may be used.

Various modifications and changes in the design, construction and use of my improved tire may be resorted to without departing from the spirit of the invention, or sacrificing any of its advantages.

What I claim as my invention and desire to secure by Letters Patent is:—

1. A tread of resilient material presenting inclosed outlines of hard material, one being within the other, and anti-slipping material in the space between said outlines.

2. A tread of resilient material presenting inclosed circular outlines of hard material, one being within the other, and anti-slipping material in the annulus between said outlines.

3. A tread of resilient material presenting inclosed outlines of hard material, one being within the other, and secured in said resilient material and anti-slipping material in the space between said outlines.

4. A tread of resilient material presenting inclosed circular outlines of hard material, one being within the other, and secured in said resilient material, and anti-slipping material in the annulus between said outlines.

5. A tread of resilient material presenting inclosed outlines of hard material, one being within the other, and secured in said resilient material by flanges and anti-slipping material in the space between said outlines.

6. A tread of resilient material presenting inclosed circular outlines of hard material, one being within the other, and secured in said resilient material by flanges, and anti-slipping material in the annulus between said outlines.

7. A tire comprising an inner lining and a tread portion of resilient material, a strip of strong and flexible material in said tread portion substantially near said lining, and ferrules connecting with said strip and interfitting to form an annular space for the insertion of a non-slipping material.

8. A tire comprising an inner lining and a tread portion of resilient material, a strip of strong and flexible material in said tread portion substantially near said lining, and ferrules connecting with said strip by flanges and interfitting to form an annular space for the insertion of a non-slipping material.

9. A tire comprising an inner lining and a tread portion of resilient material, a strip of strong and flexible material in said tread portion substantially near said lining, and ferrules connecting with said strip and interfitting to form an annular space for the insertion of a non-slipping material, said ferrules and non-slipping material extending to the outer face of said tread portion.

10. A tire comprising an inner lining and a tread portion of resilient material, a strip of strong and flexible material in said tread portion substantially near said lining, and ferrules connecting with said strip by flanges and interfitting to form an annular space for the insertion of a non-slipping material, said ferrules and non-slipping material extending to the outer face of said tread portion.

11. A tire comprising an inner lining and a tread portion of resilient material, a strip of strong and flexible material in said tread portion substantially near said lining, said strip having openings in the same, ferrules extending through said openings, and ferrules around said first named ferrules forming annular spaces between the same for the insertion of a non-slipping material.

12. A tire comprising an inner lining and a tread portion of resilient material, a strip of strong and flexible material in said tread portion substantially near said lining, said strip having openings in the asme, ferrules extending through said openings and connected to said strip, and ferrules around said first named ferrules connected to said strip and forming annular spaces between the same for the insertion of a non-slipping material.

13. A tire comprising an inner lining and a tread portion of resilient material, a strip of strong and flexible material in said tread portion substantially near said lining, said strip having openings in the same, ferrules extending through said openings, ferrules around said first named ferrules forming annular spaces between the same for the insertion of a non-slipping material, and a filling of resilient material within said first named ferrules.

14. A tire comprising an inner lining and a tread portion of resilient material, a strip of strong and flexible material in said tread portion substantially near said lining, said strip having openings in the same, ferrules extending through said openings and connected to said strip, ferrules around said first named ferrules connected to said strip and forming annular spaces between the same for the insertion of a non-slipping material, and a filling of resilient material within said first named ferrules.

In testimony whereof, I the said HENRY C. SEIPP have hereunto set my hand.

HENRY C. SEIPP.

Witnesses:
T. B. HUMPHRIES,
J. N. COOKE.